Sept. 24, 1940.  W. W. DUNN  2,215,606
HOOD SAFETY LOCKING MECHANISM
Filed Dec. 2, 1939  2 Sheets-Sheet 1
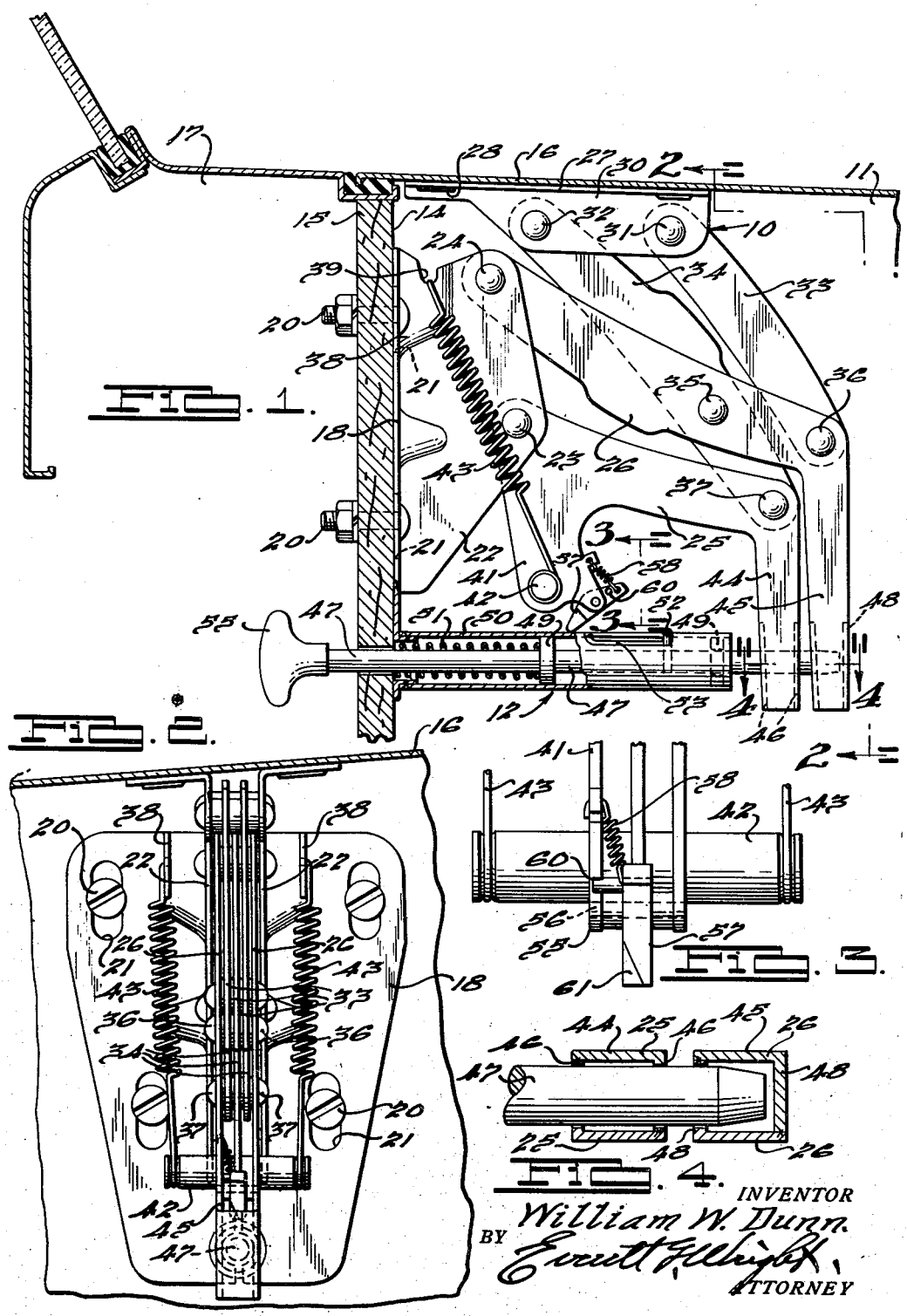
INVENTOR
William W. Dunn
BY
ATTORNEY

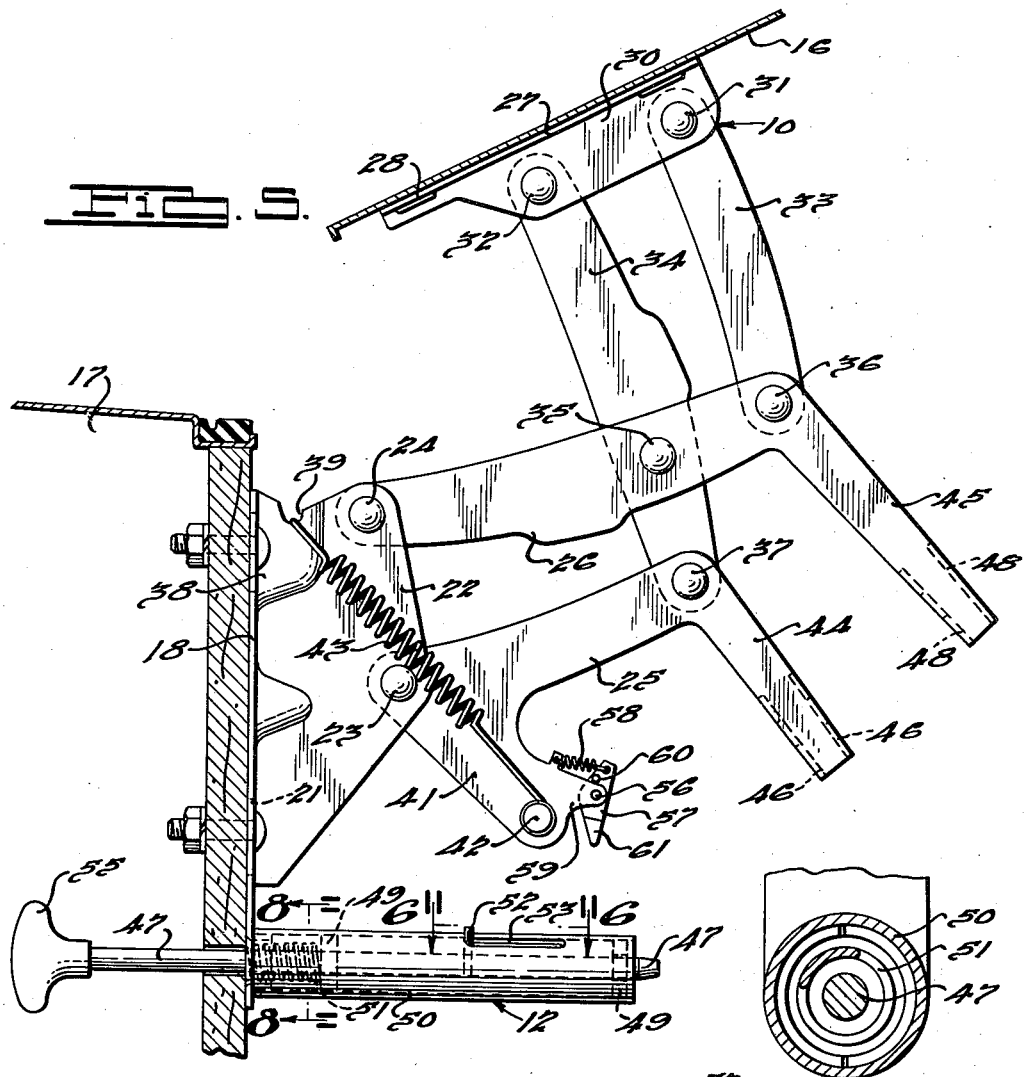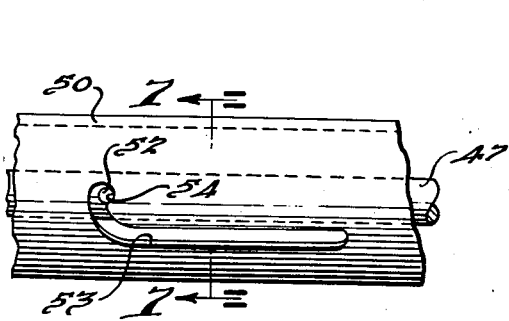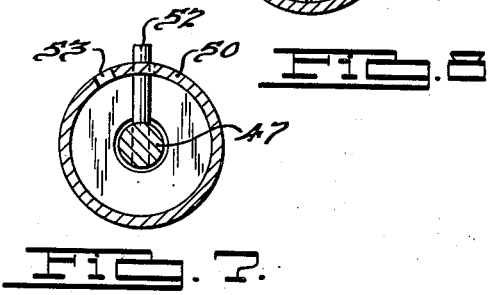

Patented Sept. 24, 1940

2,215,606

UNITED STATES PATENT OFFICE 2,215,606

HOOD SAFETY LOCKING MECHANISM

William W. Dunn, Detroit, Mich.

Application December 2, 1939, Serial No. 307,191

7 Claims. (Cl. 16—144)

This invention relates to hood safety locking mechanism particularly applicable as safety locking means for well-known alligator type hoods which are hingedly supported on the dash of motor vehicles.

It is customary to hingedly support the rear end of an alligator type hood from the front of the dash of a motor vehicle below the cowl thereof and to latch the alligator hood in a closed position with suitable latching means located at the forward end thereof. The means employed to latch the alligator hood in its closed position often becomes worn or is often improperly secured so that, when the vehicle is being driven along a highway, the latching means becomes ineffective and air pressure against the under surface of the alligator hood causes the same to be lifted whereupon the vision of the driver of the vehicle is cut off and accidents occur before the vehicle can be brought to a stop.

Also, alligator type hoods which are manually latched at the front thereof may be unlatched at any time to obtain access to the engine compartment. Then by means of a fishing wire manipulated through the dash from under the hood, the doors of a motor vehicle may be opened. All of which subjects the vehicle to being tampered with or stolen in the absence of the operator.

With the foregoing in view, one object of the invention is to provide means for automatically making the hood hinge of the alligator hood of a motor vehicle inoperative once the said hood is closed until manually released from within the passenger compartment of the said motor vehicle.

Another object of the invention is to provide means for automatically locking at least one of the hinges of an alligator type hood of a motor vehicle in its closed position whenever such hood is brought to its closed position.

Another object of the invention is to provide means cooperating with at least one of the hinges of the alligator hood of a motor vehicle for automatically locking the said hinge in an inoperative position upon the closing of the said hood, the said locking means being manually releasable from within the passenger compartment of the motor vehicle, and upon such manual releasing, the said locking means becomes set again to lock automatically the hood in a closed position after the said hood is again opened and then closed.

Another object of the invention is to provide a novel economical-to-manufacture alligator hood safety locking mechanism combined with at least one of the hinges supporting the said hood, which mechanism is capable of automatically locking the said hood in its closed position when brought to such closed position and which locking mechanism is manually releasable only from within the passenger compartment of the motor vehicle.

Other objects, features and advantages of the invention will become apparent by reference to the following detailed description taken in connection with the accompanying drawings, in which:

Fig. 1 is a fragmentary view, part in section and part in elevation, showing the combination of an alligator hood and hinge construction of a motor vehicle in a closed position and a locking mechanism embodying the invention.

Fig. 2 is a vertical sectional view taken on the line 2—2 of Fig. 1.

Fig. 3 is an enlarged detailed elevational view taken on the line 3—3 of Fig. 1 showing the dog employed for automatically locking the hood hinge in an inoperative position in response to closing movement of the hood.

Fig. 4 is an enlarged detailed horizontal sectional view taken on the line 4—4 of Fig. 1 showing the locking bolt of the locking mechanism in locked engagement with suitably apertured hinged members.

Fig. 5 is a fragmentary view, part in section and part in elevation, similar to Fig. 1 except that it shows the alligator hood opened and the safety locking mechanism embodying the invention in an unlatched position.

Fig. 6 is a fragmentary top elevational view taken on the line 6—6 of Fig. 5 showing the bayonet slot provided in the top of the locking bolt cylinder with the locking bolt and bayonet pin disposed in a retracted position.

Fig. 7 is a vertical sectional view taken on the line 7—7 of Fig. 6.

Fig. 8 is an enlarged vertical sectional view taken on the line 8—8 of Fig. 5.

Referring now to the drawings wherein like numerals refer to like and corresponding parts throughout the several views, the illustrative embodiment of the invention disclosed therein comprises, in general, a plural link hinge 10 disposed in the engine compartment 11 of an automotive vehicle and mounted upon the engine compartment face 14 of a dash panel 15, with the opposite end of the hinge member 10 connected to the alligator type hood 16 which is adapted to close over the top of the engine compartment. One or more of the links of hinge 10 are modified by providing extensions thereon adapted to cooperate with a locking means, indicated generally at 12, so that the locking means, which is mounted on the engine compartment face 14 of dash panel 15 and extends through the dash panel to the passenger compartment 17, may be employed for manually locking the hood 16 in closed position over the engine compartment 11 until the said locking means 12 is retracted manually from within the said passenger compartment. As will later be described more in detail, the locking means 12 is provided with means for setting and locking the same in retracted position until the latter means is automatically released in response to closing movement of the hood 16 and thus automatically lock the hood 16 in its closed position with reference to the engine compartment whenever the said hood 16 is swung to its closed position.

Referring to Figs. 1 to 5, the plural link hinge means 10, two of such hinge means being preferably employed as indicated by the slope of hood 16 in Fig. 2, each comprises a butt member or bracket 18 bolted to the dash panel 15 by means of bolts 20 which extend through vertically disposed adjacent slots 21 provided to secure the proper vertical alignment of the hinge means. The butt member 18 is provided with a pair of spaced upstanding ears 22 through which project headed pivot pins 23 and 24. Pairs of links 25 and 26 are pivotally mounted on the pivot pins 23 and 24 respectively. A second butt member 27 is preferably riveted as indicated at 28 to the hood 16 and provided with upstanding ears 30 in which are journaled studded pivot pins 31 and 32. A plurality of links 33 are journaled on the pivot pins 31 three of such links being shown in the illustrated embodiment, and a corresponding number of links 34 are journaled on the pivot pin 32. A headed pivot pin 35 connects the links 34 to the links 26 at points intermediate the lengths of these links. A similar pivot pin 36 connects the ends of links 33 to what would normally be the ends of links 26 and a link pivot pin 37 connects the ends of links 34 to what would normally be the ends of links 25.

The butt members 18 are provided with a second pair of upstanding ears 38 having spring hold notches 39 cut therein and the links 25 are provided with angular extensions 41 through the ends of which extend a spring hold pin 42. Springs 43 are engaged in tensioned condition between the said spring hold notches 39 and pins 42 as indicated in Figs. 1, 2 and 5. When the hinge parts are in the position indicated in Fig. 1, the springs 43 function to take up any clearance between the butt members, pivot pins and links to prevent rattling of parts and tend to keep the hood 16 in closed position. A comparison of Figs. 1 and 5 discloses the fact that the spring holding pin crosses a line between the holding notches 39 and the pivot pin 23 so that when springs 43 are made sufficiently heavy they tend to hold the hood 16 in the open position indicated in Fig. 5.

The hinge parts thus far described are more or less conventional. It will be noted, however, that in the present instance the links 25 are provided with an extension 44 and the links 26 with an extension 45, which extensions are directed downwardly in approximately vertical parallel position with respect to each other when the hinges in the position indicated in Fig. 1. Referring more especially to Fig. 4, it will be noted that the extension 44 has for its side members continuations of the links 25 and ears 46 which extend normally from opposite sides of each link 25 as indicated at 46, and these ears 46 are preferably welded to the ends of the continuations of the links 25 so that the lower end of the extension 44 has a hollow, substantially rectangular section. The said ear members 46 are provided with openings therein for the reception of a bolt-like member 47 of the locking means 12. Each link 26 is likewise extended to provide side members and each link is provided with an ear 48 to complete the hollow box-like section of the lower end of the extension 45. An opening is provided in the ear 48 adjacent extension 44 also for the reception of the locking bolt 47.

Referring also to Figs. 6, 7 and 8, it will be noted that the locking bolt 47 is provided with a pair of bearing members 49 adapted to slide in a tubular member 50, and a spring 51 is arranged around the locking bolt 47 between the left hand or rear bearing member 49 and the dash panel 15 normally to move the locking bolt 47 in a right hand or forward direction as indicated in Fig. 1 to bring the same into engagement with both extensions 44 and 45 of links 25 and 26. A pin 52 fixed to the locking bolt 47 is adapted to travel in a bayonet slot 53 provided in the tubular guide 50 so that the pin 52 will be retained in a holding notch 54 when the locking bolt 47 is retracted to its extreme left hand or rear position as indicated in Figs. 5 and 6.

A knob 55 is provided at the left hand or rear end of the locking bolt 47 and makes the latter accessible from the passenger compartment 17 for retraction purposes. The cam slot 53 during retraction of locking bolt 47 cooperates with pin 52 to rotate the locking bolt so that pin 52 will always drop into the notch 54 when the locking bolt is withdrawn to its extreme left hand or rear position so that the locking bolt will remain latched in retracted position until manually released by rotating the knob 55 or released automatically by means presently to be described.

An ear 59 is provided at the end of the extension 41 of each link 25 and a pivot pin 56 is disposed through these ears 59 for supporting a cam detent 57 thereon. A spring 58 normally swings the detent 57 in a counterclockwise direction as viewed in Fig. 5, and a stop pin 60 fixed to the said detent 57 prevents counterclockwise rotation of the cam detent 57 beyond the position indicated in Fig. 5. When the hood 16 is swung from its open position indicated in Fig. 5 to the engine compartment closing position indicated in Fig. 1, it rotates the links 25 about the pivot pin 23 in a clockwise direction as viewed in Figs. 1 and 5 and causes a corresponding swinging movement of the extensions 41 and cam detent 57 and brings the cam surface 61 provided at the lower end of the cam detent 57 into engagement with the upper end of pin 52 fixed to the locking bolt 47 in such a manner as to move the pin 52 out of notch 54. This releases the locking bolt 47 so that spring 51 can move the bolt 47 from the retracted position indicated in Figs. 5 and 6 to the locking position indicated in Fig. 1.

The right hand or forward end of the locking bolt 47 then projects through the openings provided therefor at the lower end of the extensions 44 and 45 and locks the hood 16 in the closed position indicated in Fig. 1. When the hood 16 is to be swung to its open position indicated in Fig. 5, the locking bolt 47 must first be retracted manually from within the passenger compartment 17 by means of the knob 55, the cam slot 53 and pin 52 causing the latter to drop into the notch 54 to latch the locking bolt in its retracted position. When the hood 16 is again swung to its closed position indicated in Fig. 1, the cam detent 57 disengages the pin 52 from notch 54 and releases the locking bolt 47 so that it returns to the position indicated in Fig. 1 and prevents opening hood 16 until such time as the locking bolt 47 is again retracted.

As many changes may be made in the above constructions and many widely different embodiments may be had without departing from the spirit of the present invention, it is intended that all matter contained in the above description or shown in the accompanying drawings shall be interpreted as illustrative and not in a limited sense.

What is claimed is:

1. In an automotive vehicle including a dash panel and a hood for closing the engine compartment of such vehicle, the combination of means including a plurality of pivotally connected links for hingedly connecting said hood to said dash panel, extension means on at least one of said links engageable by locking means, and means carried by said dash panel and engageable with the extension of one of said links for locking said hood in closed position with respect to said engine compartment.

2. In an automotive vehicle including a dash panel separating the passenger and engine compartment of the vehicle, and a hood for said engine compartment, the combination of a plural link type of hinge connecting said hood to the engine compartment side of said dash panel, extension means on at least one of said links engageable by locking means, and means carried by and extending through said dash panel and manually releasable from the passenger compartment side of said dash panel for engaging the extension of one of the links of said hinge to lock the hood in closed position with respect to said engine compartment.

3. In an automotive vehicle including a dash panel separating the passenger and engine compartment of the vehicle, and a hood for said engine compartment, the combination of a plural link type of hinge connecting said hood to the engine compartment side of said dash panel, extension means on at least one of said links engageable by locking means, a slidable bolt carried by and extending through said dash panel, and spring means urging said bolt toward said engine compartment and into engagement with the extension of one of said links when the hood is in engine compartment closing position for locking said hood in the latter position.

4. In an automotive vehicle including a dash panel separating the passenger and engine compartment of the vehicle and a hood for said engine compartment, the combination of a plural link type of hinge connecting said hood to the engine compartment side of said dash panel, extension means on at least one of said links engageable by locking means, a slidable bolt carried by and extending through said dash panel, spring means urging said bolt toward said engine compartment and into engagement with the said extension of at least one of said links when the hood is in engine compartment closing position for locking said hood in the latter position, means on the passenger compartment end of said bolt for facilitating retraction of the bolt toward the passenger compartment and disengaging the bolt from the said extension of a link of said hinge to permit swinging movement of the hood to its open position with respect to said engine compartment.

5. In an automotive vehicle including a dash panel separating the passenger and engine compartment of the vehicle and a hood for said engine compartment, the combination of a plural link type of hinge connecting said hood to the engine compartment side of said dash panel, extension means on at least one of said links engageable by locking means, a slidable bolt carried by and extending through said dash panel, spring means urging said bolt toward said engine compartment and into engagement with the said extension of at least one of said links when the hood is in engine compartment closing position for locking said hood in the latter position, means on the passenger compartment end of said bolt for facilitating the retraction of the bolt toward the passenger compartment and disengaging the bolt from the said extension of a link of said hinge to permit swinging movement of the hood to its open position with respect to said engine compartment, and means for retaining said bolt in its retracted position.

6. In an automotive vehicle including a dash panel separating the passenger and engine compartment of the vehicle and a hood for said engine compartment, the combination of a plural link type hinge connecting said hood to the engine compartment side of said dash panel, extension means on at least one of said links engageable by locking means, a slidable bolt carried by and extending through said dash panel, spring means urging said bolt toward said engine compartment and into engagement with the said extension of at least one of said links when the hood is in engine compartment closing position for locking said hood in the latter position, means on the passenger compartment end of said bolt for facilitating the retraction of the bolt toward the passenger compartment and disengagement of the bolt from the said extension of a link of said hinge to permit swinging of the hood to open position with respect to said engine compartment, means for retaining said bolt in its retracted position, and means operable by said hinge in response to closing movement of said hood for effecting release of said bolt from such retractive position.

7. In an automotive vehicle including a dash panel sparating the passenger and engine compartment of the vehicle and a hood for said engine compartment, the combination of a plural link type of hinge connecting said hood to the dash panel, extension means on a plurality of said links engageable by locking means, a slidable bolt carried by and extending through said dash panel, spring means urging said bolt toward said engine compartment and into engagement with the said extensions of the said links of said hinge when the hood is in engine compartment closing position for locking said hood in the latter position, means on the passenger compartment end of said bolt for disengaging the same from the extensions of the links of said hinge to permit swinging movement of the hood to its open position with respect to said engine compartment, cam means for guiding and retaining said bolt in its retracted position, and a cam detent carried by one of the links of said hinge and operable by the hinge in response to closing movement of said hood for effecting release of said bolt from such retracted position.

WILLIAM W. DUNN.